United States Patent
Wiebe et al.

(10) Patent No.: US 7,823,370 B1
(45) Date of Patent: Nov. 2, 2010

(54) WHEELED WEED TRIMMER SUPPORT APPARATUS

(76) Inventors: Rex J. Wiebe, 363 Eckard Rd., Dalton, OH (US) 44618; Daniel Cowhick, 363 Eckard Rd., Dalton, OH (US) 44618

( * ) Notice: Subject to any disclaimer, the term of this patent is extended or adjusted under 35 U.S.C. 154(b) by 0 days.

(21) Appl. No.: 12/722,651

(22) Filed: Mar. 12, 2010

(51) Int. Cl.
*A01D 34/00* (2006.01)

(52) U.S. Cl. ......................................... 56/12.7; 56/16.7

(58) Field of Classification Search .................. 56/12.7, 56/16.7, 17.5, 13.6; D15/17, 28; D34/24, D34/26; 172/17; 280/47.24
See application file for complete search history.

(56) References Cited

U.S. PATENT DOCUMENTS

| | | | | |
|---|---|---|---|---|
| 4,182,100 A | * | 1/1980 | Letter | 56/16.7 |
| 4,442,659 A | * | 4/1984 | Enbusk | 56/12.7 |
| 4,704,849 A | * | 11/1987 | Gilbert et al. | 56/17.5 |
| 4,879,869 A | | 11/1989 | Buckendorf, Jr. | |
| 5,092,112 A | * | 3/1992 | Buckendorf, Jr. | 56/17.5 |
| 5,303,532 A | * | 4/1994 | Phillips | 56/12.7 |
| 5,408,816 A | | 4/1995 | Cartier | |
| 5,450,715 A | | 9/1995 | Murray | |
| 5,613,354 A | * | 3/1997 | Foster | 56/16.7 |
| 5,626,006 A | | 5/1997 | Fricke, Sr. | |
| 5,829,236 A | * | 11/1998 | Ballard et al. | 56/16.7 |
| 5,836,142 A | | 11/1998 | Maxwell | |
| 5,884,462 A | * | 3/1999 | Gerber | 56/12.1 |
| 5,970,694 A | * | 10/1999 | Knox, Jr. | 56/16.7 |
| 6,050,069 A | | 4/2000 | Elensky | |
| 6,085,503 A | * | 7/2000 | Hutchinson | 56/12.7 |
| D451,932 S | * | 12/2001 | Dockery | D15/28 |
| 6,363,699 B1 | * | 4/2002 | Wang | 56/12.7 |
| 6,415,588 B1 | * | 7/2002 | Kao | 56/16.7 |
| 6,604,349 B2 | * | 8/2003 | Deal | 56/12.7 |
| 6,745,549 B1 | | 6/2004 | Taylor | |
| 6,895,735 B2 | * | 5/2005 | Gallentine | 56/12.7 |
| 6,986,238 B1 | * | 1/2006 | Bloodworth | 56/12.7 |
| D528,567 S | | 9/2006 | Longo | |
| 7,360,350 B1 | * | 4/2008 | Smith, Jr. | 56/12.7 |

* cited by examiner

*Primary Examiner*—Árpád Fábián-Kovács
(74) *Attorney, Agent, or Firm*—Crossley Patent Law; Mark A. Crossley

(57) ABSTRACT

The wheeled weed trimmer support apparatus provides a vehicle for supporting a weed trimmer by adjustably clamping the trimmer shaft, typically above the shaft bend, in two spaced apart locations. By adjustably supporting the shaft with respect to both height and angular positioning of the trimmer head, a trimmer can be exactly controlled to allow angular cuts, more exact flat cuts, and overall desired positioning of the trimmer cutting line and/or blades. The rapidity with which such adjustments are made, especially accommodated by the t-handled tighteners, is further equally important to the adjustment capabilities themselves. The apparatus importantly provides support for a trimmer so that the load of the trimmer is not born by a user's back, shoulders, arms, and other muscles, joints, and bones.

4 Claims, 5 Drawing Sheets

WHEELED WEED TRIMMER SUPPORT APPARATUS

BACKGROUND OF THE INVENTION

With the advent of weed trimmers, users soon became aware of their many advantages in various forms of use. Trimmers are quite useful replacements for lawnmowers, given a small or crowded area for example. Trimmers can be used to replace more bulky and limited mowers for small yards, between plant growth, in tight corners, around flower beds, and in edging, as further example. With these discoveries came a need for trimmer support mechanisms, as carrying a weed trimmer and using a weed trimmer accurately is not an easy task. This is especially true when considering any physical limitations a user might have. For example, almost anyone who has used a trimmer is aware of shoulder and back pains that accompany their use. Therefore, various wheeled devices for supporting weed trimmers have been proposed. Most such devices provide only forward facing wheels, a design shortcoming that drastically limits a trimmer's usefulness and greatly increases the need for multiple reverses and passes in a given work area. Many such devices also fail to support a trimmer in a somewhat balanced position, a fact that adds to fatigue and inaccuracy in a trimmer's use. Another issue is that some of the trimmer supports proposed do not allow a trimmer's shaft to be pivoted, which means that the trimmer's head cannot be swiveled to accommodate various angles of attack on growth to be trimmed and in edging grass, to provide but two examples. The present apparatus solves these problems.

FIELD OF THE INVENTION

The wheeled weed trimmer support apparatus relates to weed trimmers and more especially to a wheeled apparatus that supports a weed trimmer in a balanced mode and allows omni-directional travel along with trimmer angle and height change.

SUMMARY OF THE INVENTION

The general purpose of the wheeled weed trimmer support apparatus, described subsequently in greater detail, is to provide a wheeled weed trimmer support apparatus which has many novel features that result in an improved wheeled weed trimmer support apparatus which is not anticipated, rendered obvious, suggested, or even implied by prior art, either alone or in combination thereof.

To attain this, the wheeled weed trimmer support apparatus provides a vehicle for supporting a weed trimmer by adjustably clamping the trimmer shaft, typically above the shaft bend, in two spaced apart locations. By adjustably supporting the shaft with respect to both height and angular positioning of the trimmer head, a trimmer can be exactly controlled to allow angular cuts, more exact flat cuts, and overall desired positioning of the trimmer cutting line and/or blades. The rapidity with which such adjustments are made, especially accommodated by the t-handled tighteners, is further equally important to the adjustment capabilities themselves. Additionally, the sleeve inserts' adjustments further importantly accommodate both worker and task. The apparatus importantly provides support for a trimmer so that the load of the trimmer is not born by a user's back, shoulders, arms, and other muscles, joints, and bones. The apparatus thereby importantly negates the fatigue typically associated with extended trimmer use and also thereby provides for trimmer use by those who otherwise might not be able to handle a trimmer either effectively or safely.

The insert bend is importantly disposed upwardly on the vertical sleeve insert. The insert bend provides for the upper and lower tube clamps of the vertical sleeve insert to align with the upper and lower tube clamps of the slanted sleeve insert, thereby receiving the straight section of a typical trimmer shaft of a typical weed trimmer. The slanted sleeve may be extended from the base frame at about a 45 degree angle from vertical, with the horizontal connector importantly supporting both vertical sleeve and slanted sleeve together. The full and rapid adjustability of the apparatus, the space provided within the boomeranged base frame for trimmer and trimmer shields, along with 360 degree pivoting casters importantly combine to provide utility not previously provided.

Thus has been broadly outlined the more important features of the improved wheeled weed trimmer support apparatus so that the detailed description thereof that follows may be better understood and in order that the present contribution to the art may be better appreciated.

An object of the wheeled weed trimmer support apparatus is to support a weed trimmer.

Another object of the wheeled weed trimmer support apparatus is to support a weed trimmer in a balanced fashion.

A further object of the wheeled weed trimmer support apparatus is to is to provide dual-wheeled mobility for a weed trimmer.

An added object of the wheeled weed trimmer support apparatus is to provide omni-directional wheeled travel for a weed trimmer.

And, an object of the wheeled weed trimmer support apparatus is to provide for pivotal trimmer head use.

Yet another object of the wheeled weed trimmer support apparatus is to provide height adjustment for both the user and the trimmer.

Another object of the wheeled weed trimmer support apparatus is to provide for rapidity in all adjustments of both the apparatus and a trimmer.

These together with additional objects, features and advantages of the improved wheeled weed trimmer support apparatus will be readily apparent to those of ordinary skill in the art upon reading the following detailed description of presently preferred, but nonetheless illustrative, embodiments of the improved wheeled weed trimmer support apparatus when taken in conjunction with the accompanying drawings.

In this respect, before explaining the current embodiments of the improved wheeled weed trimmer support apparatus in detail, it is to be understood that the wheeled weed trimmer support apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved wheeled weed trimmer support apparatus. It is therefore important that the claims be regarded as including such equivalent constructions insofar as they do not depart from the spirit and scope of the wheeled weed trimmer support apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the wheeled weed trimmer support apparatus generally designated by the reference number 10 will be described.

Figure 1:
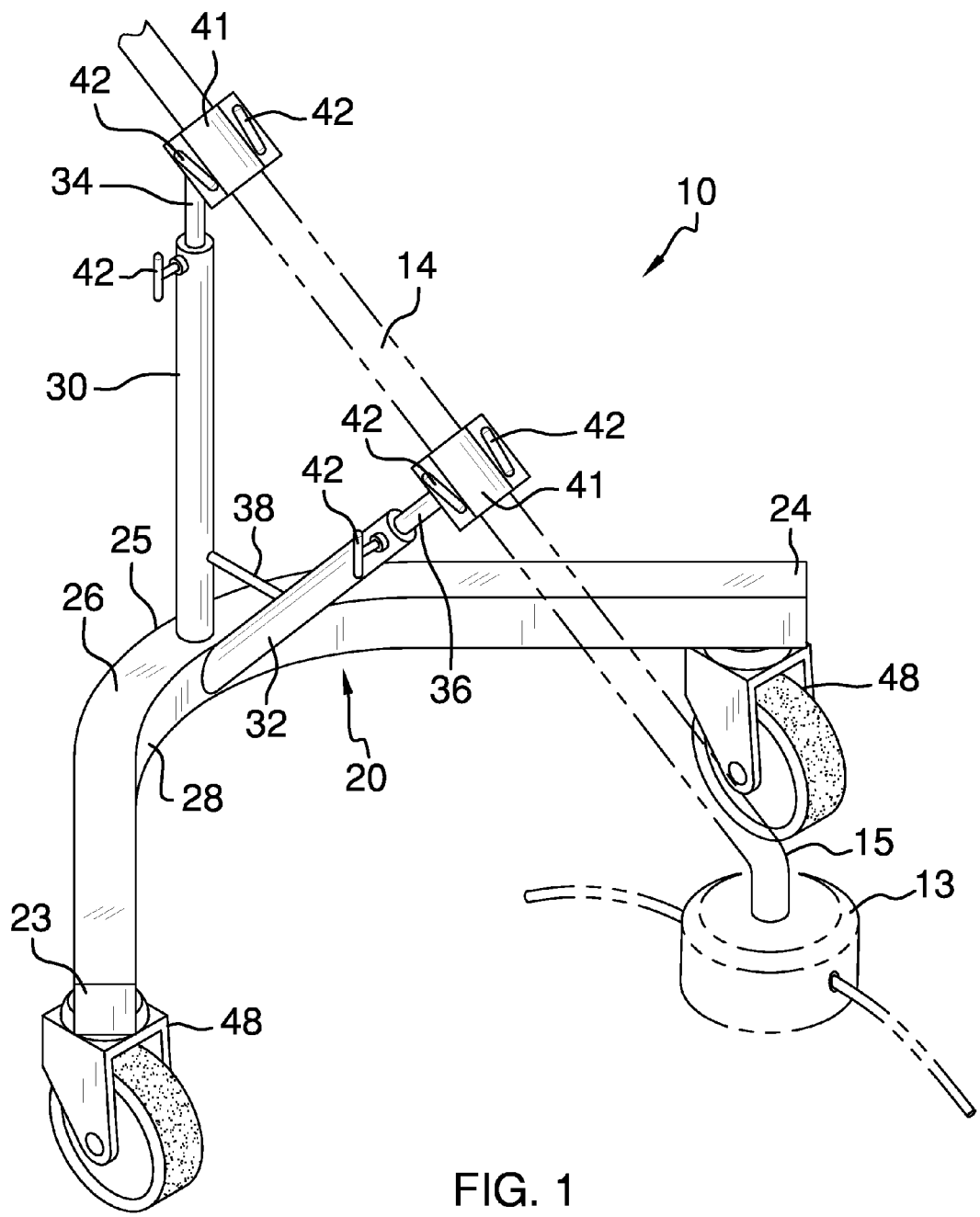
FIG. 1 is a top perspective view.
Figure 2:
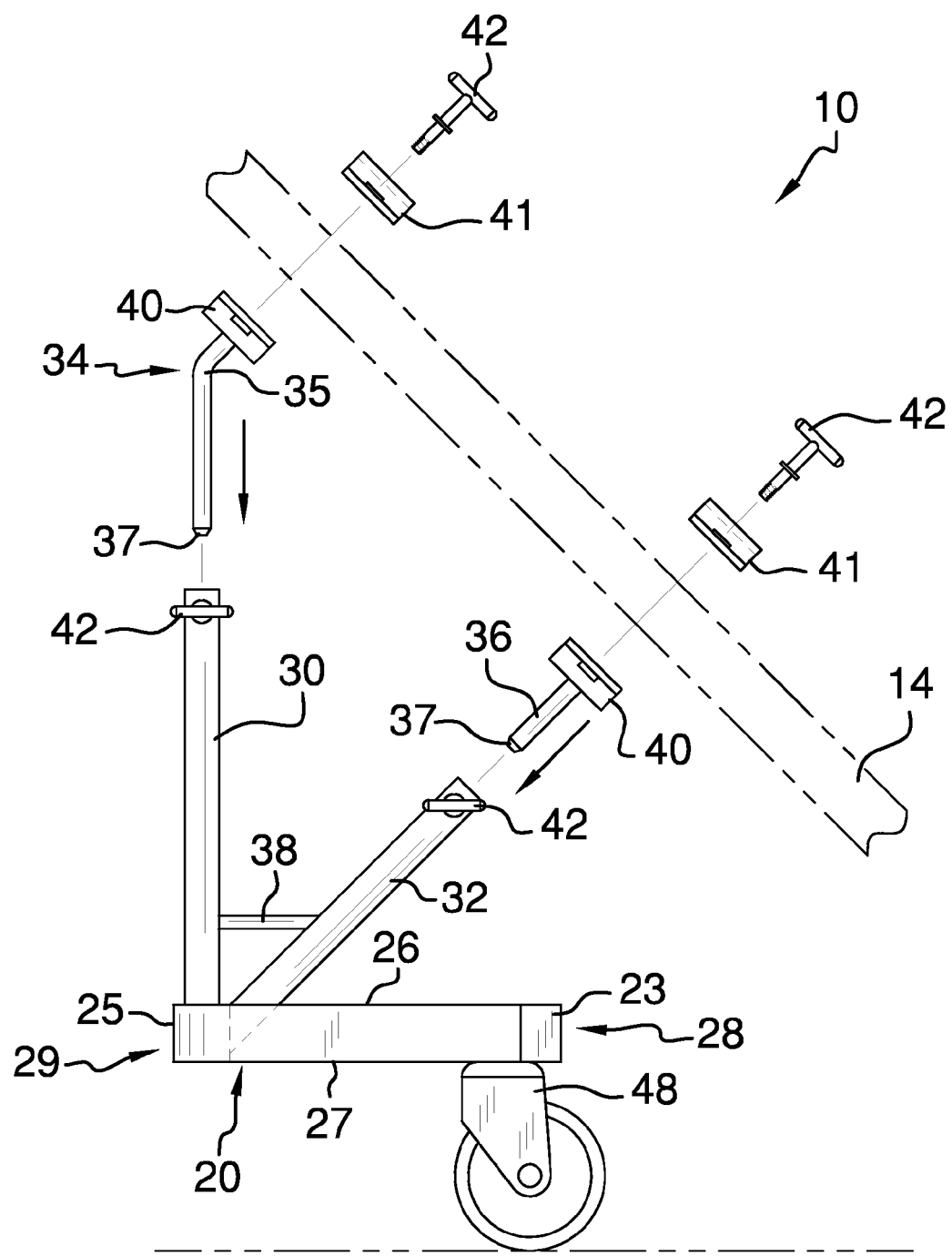
FIG. 2 is a first end elevation view.

Referring to FIGS. 1 and 2, the apparatus 10 partially comprises the boomerang shaped base frame 20 having a front 28 spaced apart from the back 29, a top 26 spaced apart from the bottom 27, a first end 23 spaced apart from the second end 24, and a center bend 25 disposed between the first end 23 and the second end 24.

Figure 3:
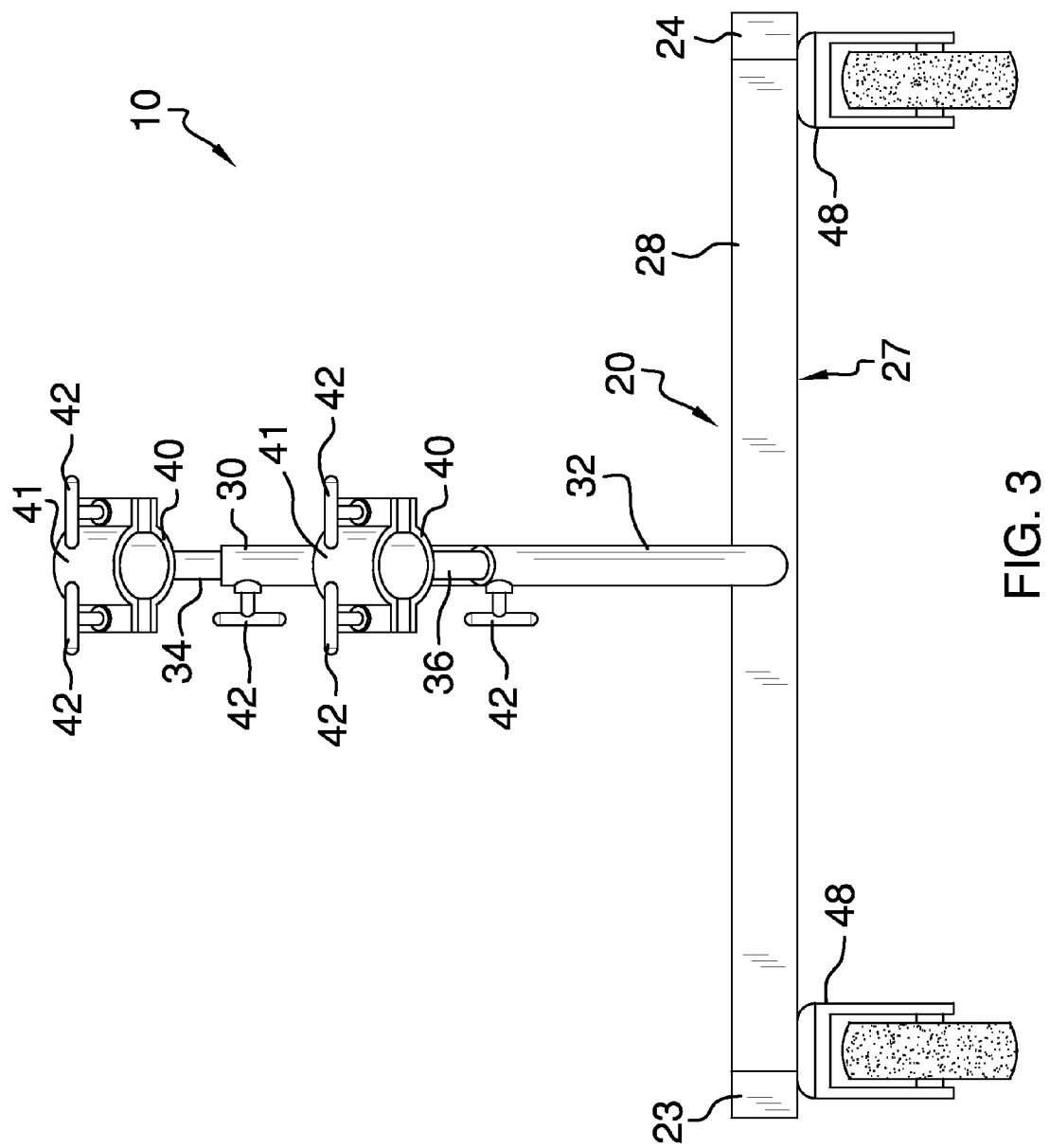
FIG. 3 is a front elevation view.

Referring to FIG. 3, a 360 degree pivoting caster 48 is disposed downwardly from the first end 23. Another 360 degree pivoting caster 48 is disposed downwardly from the second end 24.

Referring again to FIG. 2, the vertical sleeve 30 is extended perpendicularly upward from the base frame 20 center bend 25 top 26. The slanted sleeve 32 is extended forwardly and upwardly from the base frame 20 center bend 25 front 28.

Importantly, the horizontal connector 38 attaches the vertical sleeve 30 to the slanted sleeve 32 and therein provides stability to both, without significant added mass of components that would otherwise be required. The vertical sleeve insert 34 is slideably and upwardly disposed within the vertical sleeve 30. A t-handled tightener 42 selectively secures the vertical sleeve insert 34 within the vertical sleeve 30. The insert bend 35 is importantly disposed upwardly on the vertical sleeve insert 34.

Referring again to FIG. 3, a lower tube clamp 40 is mounted upwardly on the vertical sleeve insert 34 above the insert bend 35. An upper tube clamp 41 is adjustably fitted atop the lower tube clamp 40 by a pair of spaced apart t-handled tighteners 42. The slanted sleeve insert 36 is slideably and upwardly disposed within the slanted sleeve 32. A t-handled tightener 42 selectively secures the slanted sleeve insert 36 within the slanted sleeve 32. A lower tube clamp 40 is mounted upwardly on the slanted sleeve insert 36. An upper tube clamp 41 is adjustably fitted atop the lower tube clamp 40 by a pair of spaced apart t-handled tighteners 42.

Figure 4:
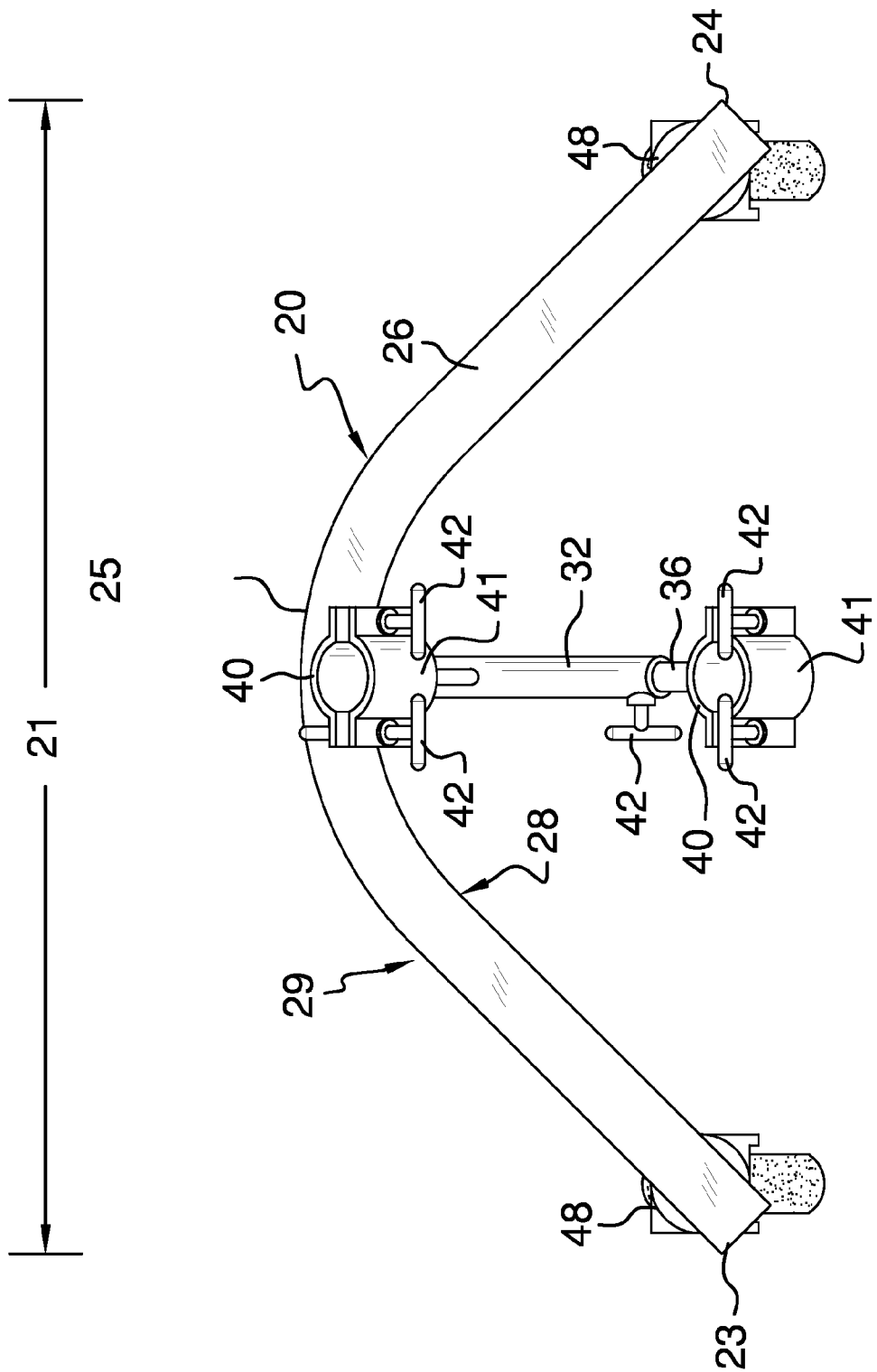
FIG. 4 is a top plan view.
Figure 5:
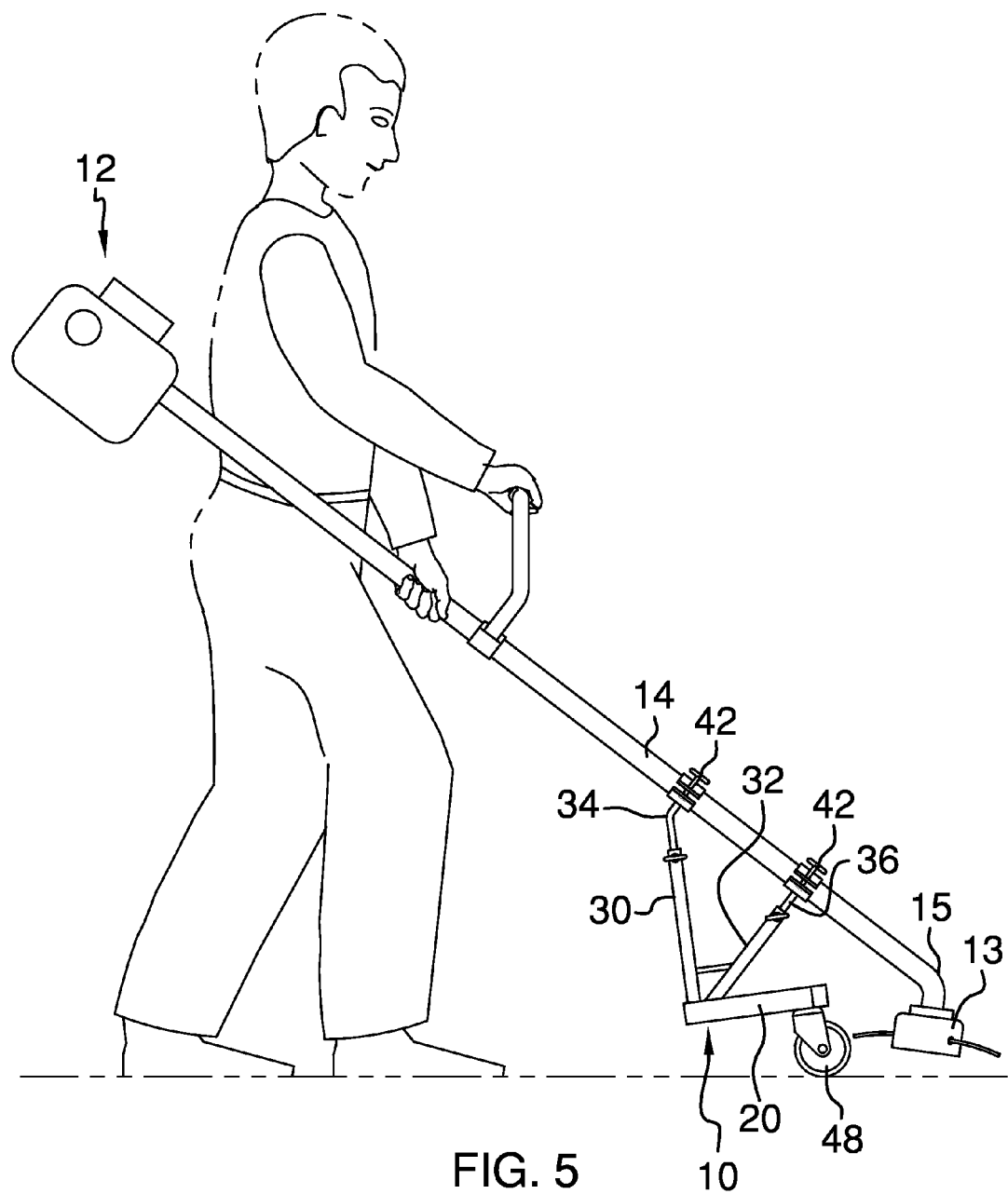
FIG. 5 is a lateral elevation view of the apparatus in use.

Referring to FIG. 5, a trimmer shaft 14 of an existing weed trimmer 12 is adjustably and removably disposed within the upper tube clamps 41 and lower tube clamps 40 of the vertical sleeve insert 34 and the slanted sleeve insert 36. Referring to FIG. 4, the base frame 20 ideally has a base width 21 of about 13 inches, thereby importantly providing apparatus 10 stability without undue dimensions which might otherwise interfere in reaching tight places with a trimmer 12. Trimmers typically include trimmer heads 13 and shaft bends 15.

With respect to the above description then, it is to be realized that the optimum dimensional relationships for the parts of the wheeled weed trimmer support apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the wheeled weed trimmer support apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the wheeled weed trimmer support apparatus may be used.

Therefore, the foregoing is considered as illustrative only of the principles of the wheeled weed trimmer support apparatus. Further, since numerous modifications and changes will readily occur to those skilled in the art, it is not desired to limit the wheeled weed trimmer support apparatus to the exact construction and operation shown and described, and accordingly, all suitable modifications and equivalents may be resorted to, falling within the scope of the wheeled weed trimmer support apparatus.

What is claimed is:

1. A wheeled weed trimmer support apparatus comprising, in combination:
    a boomerang shaped base frame having a front spaced apart from a back, a top spaced apart from a bottom, a first end spaced apart from a second end, and a center bend between the first end and the second end;
    a 360 degree pivoting caster disposed downwardly from the first end;
    a 360 degree pivoting caster disposed downwardly from the second end;
    a vertical sleeve extended perpendicularly upward from the base frame center bend top;
    a slanted sleeve extended forwardly and upwardly from the base frame center bend front;
    a vertical sleeve insert slideably and upwardly disposed within the vertical sleeve;
    a t-handled tightener selectively securing the vertical sleeve insert within the vertical sleeve;
    an insert bend disposed upwardly on the vertical sleeve insert;
    a lower tube clamp mounted upwardly on the vertical sleeve insert above the insert bend;
    an upper tube clamp adjustably fitted atop the lower tube clamp by a pair of spaced apart t-handled tighteners;
    a slanted sleeve insert slideably and upwardly disposed within the slanted sleeve;
    a t-handled tightener selectively securing the slanted sleeve insert within the slanted sleeve;
    a lower tube clamp mounted upwardly on the slanted sleeve insert;
    an upper tube clamp adjustably fitted atop the lower tube clamp by a pair of spaced apart t-handled tighteners;
    whereby a trimmer shaft of an existing weed trimmer is adjustably and removably disposed within the upper tube clamps and the lower tube clamps of the vertical sleeve insert and the slanted sleeve insert.

2. The apparatus according to claim 1 further comprising a horizontal connector attaching the vertical sleeve to the slanted sleeve, the horizontal connector proximal to the base frame.

3. The apparatus according to claim 1 wherein the slanted sleeve is extended at about a 45 degree angle from vertical.

4. The apparatus according to claim 2 wherein the slanted sleeve is extended at about a 45 degree angle from vertical.

* * * * *